United States Patent
Kim et al.

(10) Patent No.: US 8,665,669 B2
(45) Date of Patent: Mar. 4, 2014

(54) ACOUSTIC SIGNAL DETECTOR

(75) Inventors: Woo-Shik Kim, Gyeonggi-do (KR); Dae-Won Do, Gyeongsangnam-Do (KR); Sang-Moon Choi, Gyeongsangnam-Do (KR); Dong-Hoon Lee, Gyeongsangnam-Do (KR)

(73) Assignee: Agency for Defense Development, Daejeon (KR)

( * ) Notice: Subject to any disclaimer, the term of this patent is extended or adjusted under 35 U.S.C. 154(b) by 309 days.

(21) Appl. No.: 13/098,696

(22) Filed: May 2, 2011

(65) Prior Publication Data

US 2012/0170414 A1 Jul. 5, 2012

(30) Foreign Application Priority Data

Dec. 30, 2010 (KR) .................... 10-2010-0139586

(51) Int. Cl.
 *H04B 11/00* (2006.01)
(52) U.S. Cl.
 USPC .......................................... 367/131; 367/153
(58) Field of Classification Search
 USPC ..................... 367/99, 129, 131, 153
 See application file for complete search history.

(56) References Cited

U.S. PATENT DOCUMENTS

| | | | |
|---|---|---|---|
| 3,864,666 A * | 2/1975 | Douglas ........................ | 367/126 |
| 4,004,266 A | 1/1977 | Cook et al. | |
| 4,253,168 A | 2/1981 | Petrosky et al. | |
| 4,449,211 A | 5/1984 | Schmidt et al. | |
| 4,731,763 A | 3/1988 | Wagner | |
| 5,243,566 A * | 9/1993 | Anderson ..................... | 367/153 |
| 5,602,801 A | 2/1997 | Nussbaum et al. | |
| 6,105,504 A * | 8/2000 | Ayres et al. ................... | 102/220 |
| 6,671,229 B2 * | 12/2003 | Schmidt ........................ | 367/153 |
| 2003/0117897 A1 * | 6/2003 | Schmidt ........................ | 367/153 |
| 2009/0000860 A1 | 1/2009 | Plunkett et al. | |

FOREIGN PATENT DOCUMENTS

JP  2004-361258 A  12/2004
KR  10-2005-0017196 A  2/2005

OTHER PUBLICATIONS

Korean Office Action dated Jan. 27, 2012, issued in corresponding Korean Patent Application No. 10-2010-0139586.

* cited by examiner

*Primary Examiner* — Mark Hellner
(74) *Attorney, Agent, or Firm* — Scully, Scott, Murphy & Presser, P.C.

(57) ABSTRACT

Disclosed is an acoustic signal detector for detecting a target with moving in water. The acoustic signal detector may include a body having a front portion, the front portion having a cross section which becomes gradually narrow and an end formed to have a plane. The plane may be perpendicular to a moving direction of the acoustic signal detector. The acoustic signal detector may further include a plurality of sensor arrays configured to generate sound and detect sound returned by being reflected by a target. The plurality of sensor arrays may be mounted on a side surface of the front portion and on the plane.

5 Claims, 5 Drawing Sheets

ACOUSTIC SIGNAL DETECTOR

CROSS-REFERENCE TO A RELATED APPLICATION

Pursuant to 35 U.S.C. §119(a), this application claims the benefit of earlier filing date and right of priority to Korean Application No. 10-2010-0139586, filed on Dec. 30, 2010, the content of which is incorporated by reference herein in its entirety.

BACKGROUND OF THE DISCLOSURE

1. Field of the Disclosure

The present disclosure relates to an acoustic signal detector.

2. Background of the Disclosure

A target detection technique in a marine detection research field may include an active acoustic signal detection technique using a principle that a signal is transmitted to a target and then the signal is returned to the original position by the target, a passive acoustic signal detection technique using a principle that an acoustic signal transmitted from a target is received for detection, etc.

According to the active acoustic signal detection technique, a target is detected by using a signal transmitted to the target which is silently moving in water, and then returned by the target. In this active acoustic signal detection technique, it is important to generate an acoustic signal of a high output so as to detect a remote underwater target.

In order to generate an acoustic signal of a high output, a plurality of acoustic sensors are preferably arranged rather than a single acoustic sensor is used. By arranging the plurality of acoustic sensors, a transmitting beam of a high output is formed based on an output sum of each acoustic sensor toward a specific direction. Here, the beam-forming may be implemented in various manners. Generally, directivity and an output are increased as the number of acoustic sensors is increased.

In order to detect an acoustic signal reflected by a target by the active acoustic signal detection technique, or an acoustic signal directly emitted from a target by the passive acoustic signal detection technique in a wide range of marine environments, a signal has to be received in various directions. In order to precisely detect a target by receiving a signal in a wide range of directions, a plurality of acoustic sensors are used to form a receiving beam thus to increase a receiving gain. And, a plurality of receiving beams with respect to a wide range of directions are generated to precisely obtain an azimuth.

In order to precisely generate a receiving beam, the number and arrangements of sensors are important. Here, the directional beams can be precisely generated as the number of sensors is increased.

Both in the active acoustic signal detection technique and the passive acoustic signal detection technique, it is important to arrange sensors.

However, the active acoustic signal detection technique has been developed with focusing on a high output of a transmitting signal, rather than focusing on arrangements of sensors. And, the passive acoustic signal detection technique has been developed with focusing on enhancing a passive detection function by generating precise directional beams with respect to a wide range of directions.

Especially, in case of a body of a moving object which moves at a high speed in water such as an underwater guided weapon, a front part of the body of the moving object is formed in a streamlined shape due to many problems including noise. This restriction in shape causes not only the number of sensors but also arrangements of sensors to be severely limited.

More concretely, in a condition of the streamlined shape, there is a problem in forming a transmitting beam of a high output due to a small number of sensors which can be arranged. Furthermore, even if sensors are arranged in a state that a front shape of a body of a moving object which moves at a high speed has been changed in order to form a transmitting beam of a high output, there is a limitation in detecting a target in a wide range of directions.

SUMMARY OF THE DISCLOSURE

Therefore, an object of the present disclosure is to provide an acoustic signal detector capable of efficiently arranging acoustic sensors in order to enhance an acoustic signal detection function when detecting, by using an acoustic signal, a target which moves at a high speed in water.

More concretely, an object of the present disclosure is to provide a method for arranging acoustic sensors capable of enhancing an output of a transmitting beam and capable of forming a receiving beam of a high gain in wide ranges, by solving the conventional problems in arranging acoustic sensors on a body of a moving object which moves at a high speed in water.

To achieve these and other advantages and in accordance with the purpose of the present disclosure, as embodied and broadly described herein, there is provided a hybrid arrangement method for arranging sensors on a planar surface and a side surface.

More concretely, to achieve these and other advantages and in accordance with the purpose of the present disclosure, as embodied and broadly described herein, there is provided an acoustic signal detector for detecting a target with moving in water, the acoustic signal detector including a body having a front portion, wherein the front portion is formed to have a cross section which becomes gradually narrow, and an end of the front portion is formed to have a planar surface. The plane may be perpendicular to a moving direction of the acoustic signal detector. The acoustic signal detector may further include a plurality of sensor arrays configured to generate sound and detect sound returned by being reflected by a target. The plurality of sensor arrays may be mounted on a side surface of the front portion and on the planar surface.

The front portion may be formed in a conical shape such that the cross section thereof becomes narrow gradually.

The front portion may be formed in a streamlined shape such that a cross section thereof becomes narrow gradually with a curvature.

The sensor arrays may be mounted on parts of the side surface.

Each of the sensor arrays may be mounted to encompass the side surface with a constant interval.

The present disclosure is to enhance an output of a transmitting beam and to form a receiving beam of a high gain in wide ranges, by improving an arrangement method of acoustic sensors.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE DISCLOSURE

Description will now be given in detail of the present disclosure, with reference to the accompanying drawings.

For the sake of brief description with reference to the drawings, the same or equivalent components will be provided with the same reference numbers, and description thereof will not be repeated.

Figure 1:
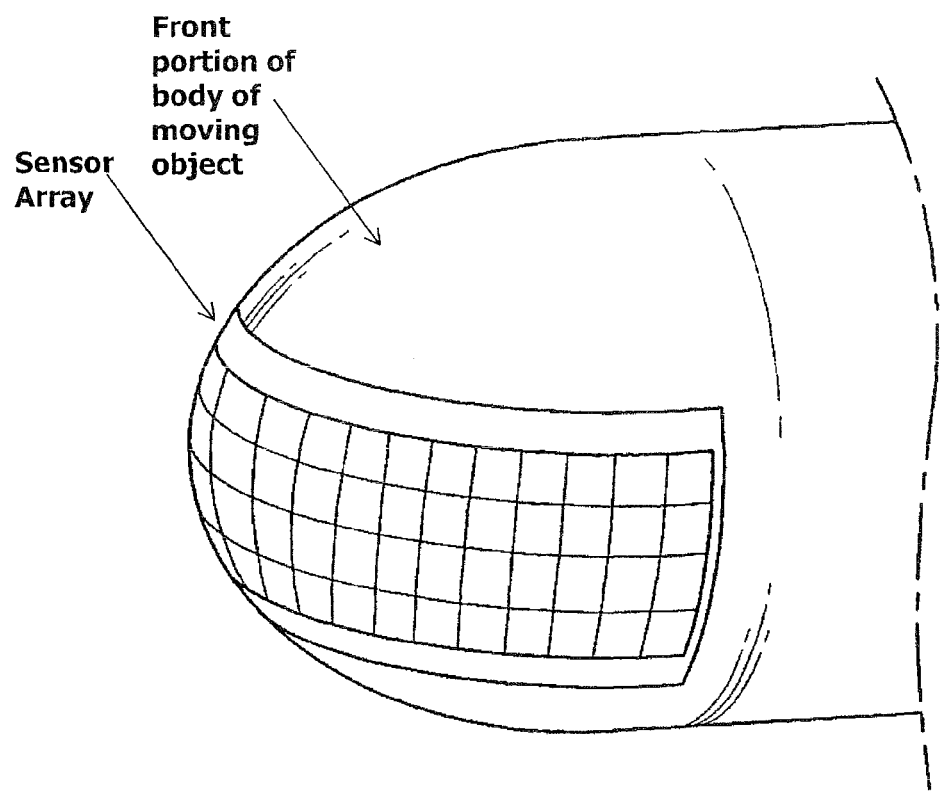
FIG. 1 is an exemplary view showing that acoustic sensors are arranged in a ball-shaped manner.

FIG. 1 is an exemplary view showing that acoustic sensors are arranged in a ball-shaped manner.

Referring to FIG. 1, acoustic sensors are arranged at a front portion of a body of a moving object which moves in water at a high speed.

A front portion of the body of the moving object which moves at a high speed is formed in a streamlined shape in order to minimize the occurrence of noise. Accordingly, the acoustic sensors are also arranged in a ball-shaped manner in correspondence to the shape of the front portion of the body of the moving object. The acoustic sensors may generate sound for active acoustic signal detection, and may detect sound returned by being reflected by a target.

This ball-shaped arrangement has advantages that noise occurs less when a body of a moving object moves at a high speed, and a target is detected by using signals received from a wide range of directions.

However, all of the sensors arranged in a ball-shaped manner are not used to form transmitting and receiving beams. Rather, some of the sensors which face specific directions in a ball shape are used to form transmitting and receiving beams.

Since transmitting and receiving beams are formed by using some sensors, the number of effective (valid) sensors for enhancing an output of transmitting and receiving beams and a receiving gain of a receiving beam is not large. This may degrade a detection performance by an active acoustic signal detection method.

The method for arranging an acoustic sensor in a ball-shaped manner is advantageous in minimizing noise occurring when a body of a moving object moves in water at a high speed. However, the method is disadvantageous in enhancing a performance of an active acoustic signal detection method since it is difficult to generate a transmitting beam of a high output and a receiving beam of a high gain.

Figure 2:
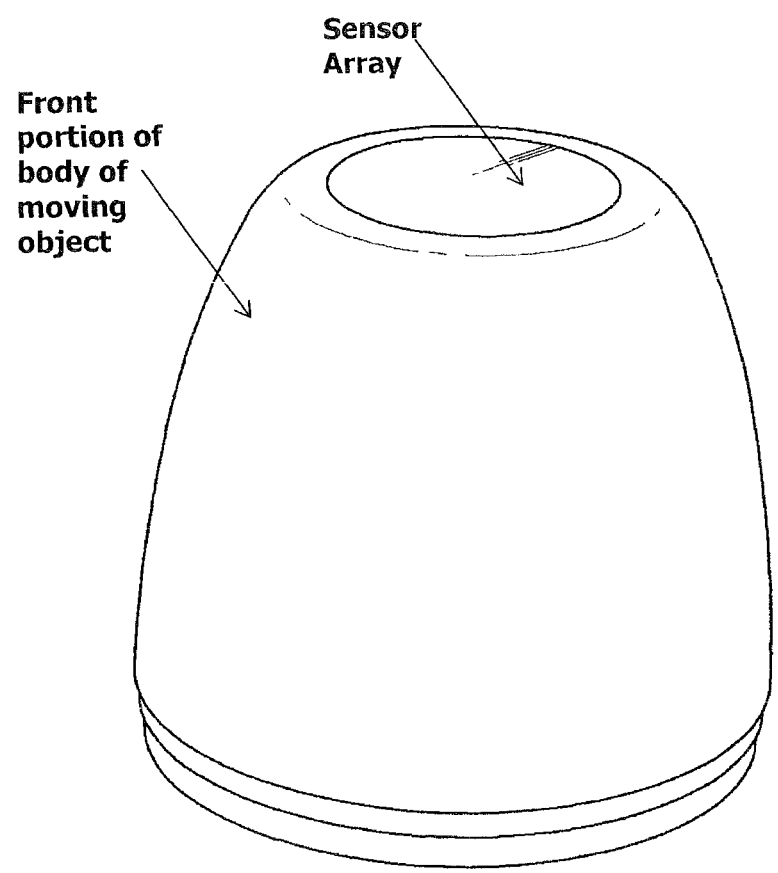
FIG. 2 is an exemplary view showing that acoustic sensors are arranged in a plane manner.

FIG. 2 is an exemplary view showing that acoustic sensors are arranged in a plane manner.

Referring to FIG. 2, a front portion of a body of a moving object which moves in water is entirely formed in a streamlined shape, and the end of the front portion is formed in a planar shape. Sensors are arranged at the end of the body of the moving object in a plane manner.

An area and a shape of the plane are determined with consideration of various factors such as fluid dynamics by a high speed, noise, and sensor arrangements. Detailed descriptions about the plane determination are out of the range of the present disclosure, and thus explanations thereof will be omitted.

In the case of arranging acoustic sensors in a plane manner, the number of acoustic sensors which face the front side is large. Accordingly, an output of a transmitting beam and a gain of a receiving beam in a front direction may be increased.

In other directions rather than the front direction, a target is detected by generating directional beams which are toward specific directions by using input and output time delay of sensors when generating transmitting and receiving beams. The directional beams which are toward specific directions in a plane arrangement of sensors have a wider beam width when they are more spaced from the front side. Accordingly, it is difficult to precisely detect a target when the directional beams are out of the range of the front side.

More concretely, the plane arrangement has an advantage in generating a transmitting beam of a high output and a receiving beam of a high gain. However, the plane arrangement has a disadvantage that a wide range of detection performance is degraded due to a limited performance of the directional beams.

When considering only a detection performance, it is advantageous to form a transmitting beam of a high output and a receiving beam of a high gain by using a plane arrangement in which there are many effective sensors which face one direction. However, in this case, an acoustic signal detection performance is lowered in a wide range of detections. Accordingly, a new sensor arrangement method will be provided hereinafter.

Figure 3:
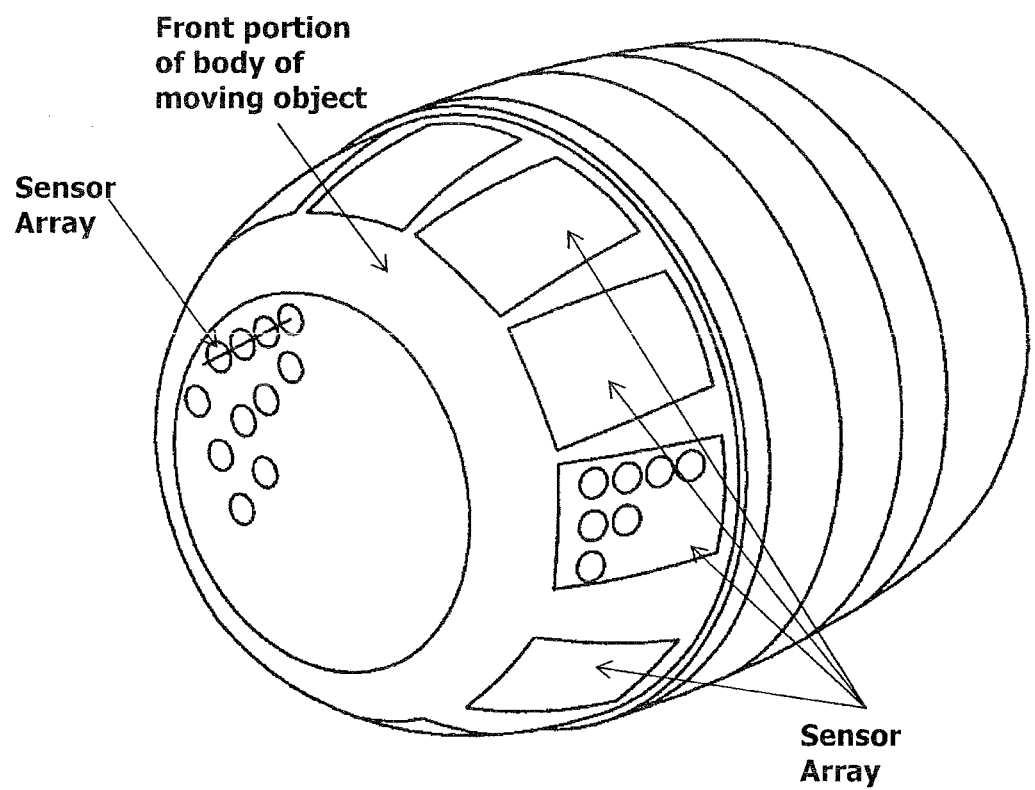
FIG. 3 is an exemplary view showing that acoustic sensors are arranged in a hybrid manner.

FIG. 3 is an exemplary view showing that acoustic sensors are arranged in a hybrid type.

Referring to FIG. 3, sensors are arranged to form transmitting and receiving beams in a hybrid manner neither in a ball-shaped manner nor in a planar manner.

A front portion of a body of a moving object which moves in water is formed in a streamlined shape. That is, the front portion of the body of the moving object is formed to have a cross section which becomes gradually narrow with a curvature. Since the front portion of the body of the moving object is formed to have a cross section which becomes gradually narrow with a curvature, a side surface of the body of the moving object is formed to be curved. The end of the front portion of the body of the moving object is formed to be planar.

Alternatively, the front portion of the body of the moving object may be formed in a conic solid shape, and the end of the front portion of the body of the moving object may be formed to be planar.

Accordingly, sensors are arranged in a plane manner at the end of the body of the moving object. A plurality of sensors are arranged at the front portion of the body of the moving object with encompassing a side surface of the body of the moving object. More concretely, a plurality of sensors constitute one array, and each array may be arranged to encompass the curved side surface.

The sensors attached to the side surface face directions different from the direction faced by the sensor arranged at the end in a plane manner. This may allow detections to be easily performed with respect to directions that cannot be precisely detected by a plane arrangement. Accordingly, a detection area may be widened through a detection method using the side arrangement. This may overcome the conventional problems occurring when using a detection method using a plane arrangement, and may allow a wide range of detections like in a detection method using a ball-shaped arrangement.

Figure 4:
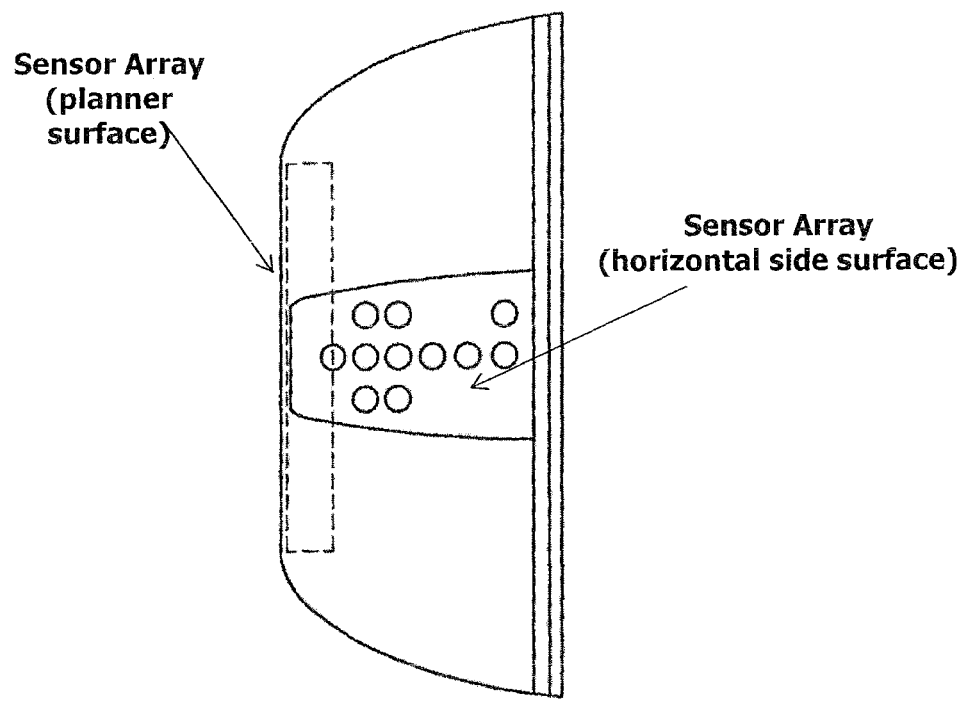
FIG. 4 is an exemplary view showing that acoustic sensors are arranged on a planar surface and a horizontal side surface.

FIG. 4 is an exemplary view showing that acoustic sensors are arranged on a plane surface and a horizontal side surface.

The position of the side arrangement is determined according to directions required at the time of a wide range of detections. When a wide range of detections are required in all directions including horizontal and vertical directions, an arrangement type to encompass the side surface shown in FIG. 3 may be advantageous.

However, when only a wide range of detections with respect to a horizontal direction are required, it may be advantageous to arrange the sensor arrays only on a part of the side surface as shown in FIG. 4. The part of the side surface where the sensor arrays are positioned may be a front direction, a right direction, a left direction, or a rear direction of the moving object.

Alternatively, the sensor arrays may be spacing from each other with an angle of 30°, 45°, 60° or 90°. The number and the arrangement interval of the arrays may be variable according to a required function.

Figure 5:
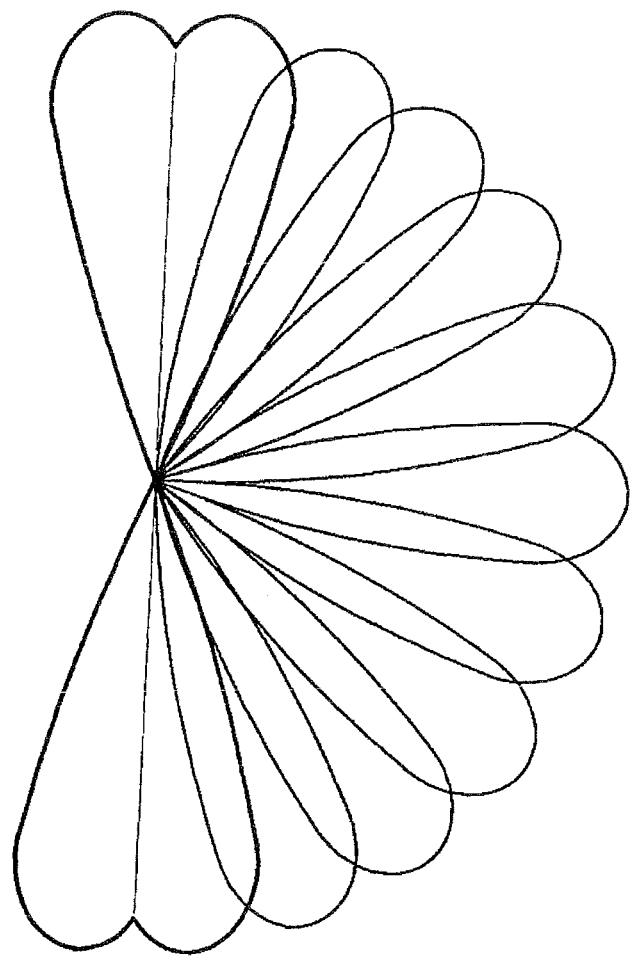
FIG. 5 is a view showing an acoustic signal detection function according to an arrangement method of the acoustic sensors in FIGS. 3 and 4.

FIG. 5 is a view showing an acoustic signal detection function according to an arrangement method of the sensors in FIGS. 3 and 4.

In FIG. 5, beams represented with a bright color indicate transmitting and receiving beams generated from a plane arrangement, whereas beams represented with a dark color indicate transmitting and receiving beams generated from a side arrangement.

By using the plane arrangement of the hybrid type, a transmitting signal may reach up to a target which moves silently at a remote distance by enhancing an output of a transmitting beam. And, even a signal of a low strength received by reflection may be detected by using a receiving beam of a high gain. That is, a detection performance with respect to a target from a remote distance may be enhanced by using a transmitting beam of a high output and a receiving beam of a high gain in a plane arrangement method.

Furthermore, the side arrangement may allow a wide range of detections to be performed with respect to directions that can not be precisely detected by the plane arrangement.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An acoustic signal detector for detecting a target movable in water, the acoustic signal detector comprising:
    a body comprising a front portion, the front portion comprising an end having a planar surface perpendicular to a moving direction of the acoustic signal detector, the front portion comprising a side surface defining a cross section of the front portion, wherein the cross section narrows gradually toward the planar surface; and
    a plurality of sensor arrays configured to generate sound and detect sound returned by being reflected by a target, wherein the plurality of sensor arrays are mounted on both the side surface and the planar surface.

2. The acoustic signal detector of claim 1, wherein the front portion is formed in a conical shape such that the cross section becomes narrow gradually.

3. The acoustic signal detector of claim 1, wherein the front portion is formed in a streamlined shape such that the cross section becomes narrow gradually with a curvature.

4. The acoustic signal detector of claim 1, wherein the sensor arrays are mounted on a predetermined part of the side surface.

5. The acoustic signal detector of claim 1, wherein the sensor arrays are mounted along the circumference of the side surface with a constant interval therebetween.

* * * * *